(12) United States Patent
Merlin et al.

(10) Patent No.: US 9,813,938 B2
(45) Date of Patent: Nov. 7, 2017

(54) SYSTEMS AND METHODS FOR DYNAMIC ADAPTATION OF CHANNEL ACCESS OR TRANSMISSION PARAMETERS

(71) Applicant: QUALCOMM Incorporated, San Diego, CA (US)

(72) Inventors: Simone Merlin, Solana Beach, CA (US); Amin Jafarian, Princeton, NJ (US); Maarten Menzo Wentink, Naarden (NL); James Simon Cho, Mountain View, CA (US); Gwendolyn Denise Barriac, Encinitas, CA (US); Yan Zhou, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 14/326,312

(22) Filed: Jul. 8, 2014

(65) Prior Publication Data

US 2015/0016268 A1 Jan. 15, 2015

Related U.S. Application Data

(60) Provisional application No. 61/876,692, filed on Sep. 11, 2013, provisional application No. 61/845,306, filed on Jul. 11, 2013.

(51) Int. Cl.
*H04W 28/02* (2009.01)
*H04W 28/18* (2009.01)
*H04W 84/12* (2009.01)

(52) U.S. Cl.
CPC ....... *H04W 28/0268* (2013.01); *H04W 28/18* (2013.01); *H04W 84/12* (2013.01)

(58) Field of Classification Search
CPC .. H04W 28/0268; H04W 28/18; H04W 84/12
See application file for complete search history.

(56) References Cited

U.S. PATENT DOCUMENTS 7,756,092 B1 7/2010 Ho et al.
2005/0243762 A1* 11/2005 Terry .................... H04W 28/18
370/328

(Continued)

OTHER PUBLICATIONS

Ksentini et al. "A new IEEE 802.11 MAC protocol with admission control for sensitive multimedia applications," Global Telecommunications Conference, 2005. Globecom '05. IEEE St. Loius, MO, USA Nov. 28-Dec. 2, 2005, Piscataway, NJ, USA, IEEE, vol. 5, Nov. 28, 2005, pp. 3002-3006).*

(Continued)

*Primary Examiner* — Michael Thier
*Assistant Examiner* — Brian Cox
(74) *Attorney, Agent, or Firm* — Knobbe, Martens, Olson & Bear, LLP

(57) ABSTRACT

Systems and methods for dynamically adapting channel access or transmission parameters based upon an identified channel access parameter or previously used transmission parameter are disclosed. In an aspect, an electronic device for communication over a wireless network is disclosed. The electronic device comprises a processor configured to generate a message that identifies one rule of a plurality of rules. Each of the plurality of rules defines a process for adapting a value of a communication parameter based on an identified channel access parameter. Also, each of the plurality of rules provides a particular quality of service and a particular priority for communication with the electronic device. The electronic device further comprises a transceiver configured to transmit the message to a station.

33 Claims, 9 Drawing Sheets

(56) References Cited

U.S. PATENT DOCUMENTS

| | | | | |
|---|---|---|---|---|
| 2006/0056346 | A1* | 3/2006 | Vadgama | H04L 47/14 370/329 |
| 2007/0115847 | A1* | 5/2007 | Strutt | H04L 12/2602 370/252 |
| 2007/0270102 | A1* | 11/2007 | Zhu | H04W 74/002 455/69 |
| 2012/0195296 | A1* | 8/2012 | Adachi | H04W 16/14 370/338 |
| 2012/0220325 | A1* | 8/2012 | Zhou | H04W 74/0833 455/509 |
| 2012/0230322 | A1* | 9/2012 | Wiatrowski | H04B 7/2643 370/347 |
| 2013/0070627 | A1* | 3/2013 | Chen | H04W 74/08 370/252 |
| 2014/0092860 | A1* | 4/2014 | Kneckt | H04W 72/1205 370/329 |
| 2014/0146763 | A1* | 5/2014 | Khay-Ibbat | H04W 28/0268 370/329 |
| 2014/0169339 | A1* | 6/2014 | Cheng | H04W 74/002 370/336 |
| 2014/0269369 | A1* | 9/2014 | Ghosh | H04W 74/08 370/252 |
| 2014/0355623 | A1* | 12/2014 | Waclawsky | H04L 69/163 370/465 |

OTHER PUBLICATIONS

International Search Report and Written Opinion—PCT/US2014/045957—ISA/EPO—dated Oct. 23, 2014.

Ksentini A., et al., "A new IEEE 802 .11 MAC protocol with admission control for sensitive multimedia applications", Global Telecommunications Conference, 2005. Globecom '05. IEEE St. Loius, MO, USA Nov.28-Dec. 2, 2005, Piscataway, NJ, USA, IEEE, vol. 5, Nov. 28, 2005 (Nov. 28, 2005), pp. 3002-3006, XP010879371, DOI: 10.1109/GLOCOM.2005.1578308, ISBN: 978-0-7803-9414-8.

Majkowski J., et al., "Enhanced TXOP Scheme for Efficiency Improvement of WLAN IEEE 802 .11e", 2006 IEEE 64th Vehicular Technology Conference: VTC 2006—Fall; Sep. 25-28, 2006, Montreal, Quebec, Canada, Piscataway, NJ: IEEE Operations Center, Sep. 1, 2006 (Sep. 1, 2006), pp. 1-5, XP031051540, ISBN: 978-1-4244-0062-1.

Shamy K., et al., "Efficient Rate Adaptation with QoS Support for Wireless Networks", Global Telecommunications Conference, 2008. IEEE Globecom 2008. IEEE, IEEE, Piscataway, NJ, USA, Nov. 30, 2008 (Nov. 30, 2008), pp. 1-6, XP031369844,ISBN: 978-1-4244-2324-8.

* cited by examiner

| Index 502 | QoS 504 | Rules 506 |
|---|---|---|
| 1 | QoS target 1 | Priority value = C1* log2(TXOP) + C2 |
| 2 | QoS target 2 | Priority value= C1*sqrt(TXOP) + C2 |
| 3 | QoS target 3 | Priority value = TXOP |
| 4 | QoS target 4 | Priority value = CWmax - CWmin |
| ... | ... | ... |
| n | QoS target n | Priority value = [relationship] |

*FIG. 5A*

| Priority values 552 | Adaptation settings 554 |
|---|---|
| Low priority value (ex: 0) | Adapt channel access or transmission parameters to a setting that lowers the chance for data to be sent (ex: lower Cwmin, Cwmax, use higher transmit power and retransmission limits) |
| ... | ... |
| High priority value (ex: n) | Adapt channel access or transmission parameters to a setting that increases the chance for data to be sent (ex: higher Cwmin, Cwmax, use lower transmit power and retransmission limits) |

*FIG. 5B*

SYSTEMS AND METHODS FOR DYNAMIC ADAPTATION OF CHANNEL ACCESS OR TRANSMISSION PARAMETERS

CROSS-REFERENCE TO RELATED APPLICATIONS

The present application claims priority to provisional U.S. application Ser. No. 61/845,306, entitled "Systems and Methods for Dynamic Adaptation of Channel Access or Transmission Parameters," filed Jul. 11, 2013, and provisional U.S. Application Ser. No. 61/876,692, entitled "Systems and Methods for Dynamic Adaptation of Channel Access or Transmission Parameters," filed Sep. 11, 2013. Each of these applications is assigned to the assignee hereof and is hereby expressly incorporated herein by reference in its entirety.

FIELD

The present application relates generally to wireless communications, and more specifically to systems, methods, and devices for dynamically adapting channel access or transmission parameters based upon an identified channel access parameter or previously used transmission parameter.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow for dynamic adaptation of channel access or transmission parameters based upon an identified channel access parameter.

Systems and methods for dynamically adapting channel access or transmission parameters based upon an identified channel access parameter or previously used transmission parameter are disclosed. In an aspect, an electronic device for communication over a wireless network is disclosed. The electronic device comprises a processor configured to generate a message that identifies one rule of a plurality of rules. Each of the plurality of rules defines a process for adapting a value of a communication parameter based on an identified channel access parameter. Also, each of the plurality of rules provides a particular quality of service and a particular priority for communication with the electronic device. The electronic device further comprises a transceiver configured to transmit the message to a station.

In another aspect, a station for communication over a wireless network is disclosed. The station comprises a transceiver configured to receive a message from an electronic device that identifies one rule of a plurality of rules. Each of the plurality of rules defines a process for adapting a value of a communication parameter based on an identified channel access parameter. Also, each of the plurality of rules provides a particular quality of service and a particular priority for communication with the electronic device. The station further comprises a processor configured by the one rule to adapt a value of a communication parameter based on an identified channel access parameter. The transceiver is further configured to transmit packets of data to the electronic device using the adapted value of the communication parameter.

In another aspect, a method for communication over a wireless network is disclosed. The method comprises generating a message that identifies one rule of a plurality of rules. Each of the plurality of rules defines a process for adapting a value of a communication parameter based on an identified channel access parameter. Also, each of the plurality of rules provides a particular quality of service and a particular priority for communication from a station. The method further comprises transmitting the message to the station.

In another aspect, a method for communication over a wireless network is disclosed. The method comprises receiving a message from an electronic device that identifies one rule of a plurality of rules. Each of the plurality of rules defines a process for adapting a value of a communication parameter based on an identified channel access parameter. Also, each of the plurality of rules provides a particular quality of service and a particular priority for communication with the electronic device. The method further comprises adapting a value of a communication parameter based on an identified channel access parameter in accordance with the one rule. The method further comprises transmitting packets of data to the electronic device using the adapted value of the communication parameter.

In another aspect, an electronic device for communication over a wireless network is disclosed. The electronic device includes means for generating a message that identifies one rule of a plurality of rules. Each of the plurality of rules defines a process for adapting a value of a communication parameter based on an identified channel access parameter.

Also, each of the plurality of rules provides a particular quality of service and a particular priority for communication with the electronic device. The electronic device further includes means for transmitting the message to a station.

In another aspect, a station for communication over a wireless network is disclosed. The station includes means for receiving a message from an electronic device that identifies one rule of a plurality of rules. Each of the plurality of rules defines a process for adapting a value of a communication parameter based on an identified channel access parameter. Also, each of the plurality of rules provides a particular quality of service and a particular priority for communication with the electronic device. The station further includes means for adapting a value of a communication parameter based on an identified channel access parameter in accordance with the one rule. The station further includes means for transmitting packets of data to the electronic device using the adapted value of the communication parameter.

In another aspect, a non-transitory computer-readable medium storing instructions that, when executed causes at least one physical computer processor to perform a method of wireless communication is provided. The method comprises generating a message that identifies one rule of a plurality of rules. Each of the plurality of rules defines a process for adapting a value of a communication parameter based on an identified channel access parameter. Also, each of the plurality of rules provides a particular quality of service and a particular priority for communication from a station. The method further comprises transmitting the message to the station.

In another aspect, a non-transitory computer-readable medium storing instructions that, when executed causes at least one physical computer processor to perform a method of wireless communication is provided. The method comprises receiving a message from an electronic device that identifies one rule of a plurality of rules. Each of the plurality of rules defines a process for adapting a value of a communication parameter based on an identified channel access parameter. Also, each of the plurality of rules provides a particular quality of service and a particular priority for communication with the electronic device. The method further comprises adapting a value of a communication parameter based on an identified channel access parameter in accordance with the one rule. The method further comprises transmitting packets of data to the electronic device using the adapted value of the communication parameter.

BRIEF DESCRIPTION OF THE DRAWINGS

FIG. 5A illustrates a data structure used to associate channel access parameters with a priority value in accordance with an embodiment.

FIG. 5B illustrates a data structure used to associate a priority value with an adaptation setting in accordance with an embodiment.

DETAILED DESCRIPTION

Figure 1A:
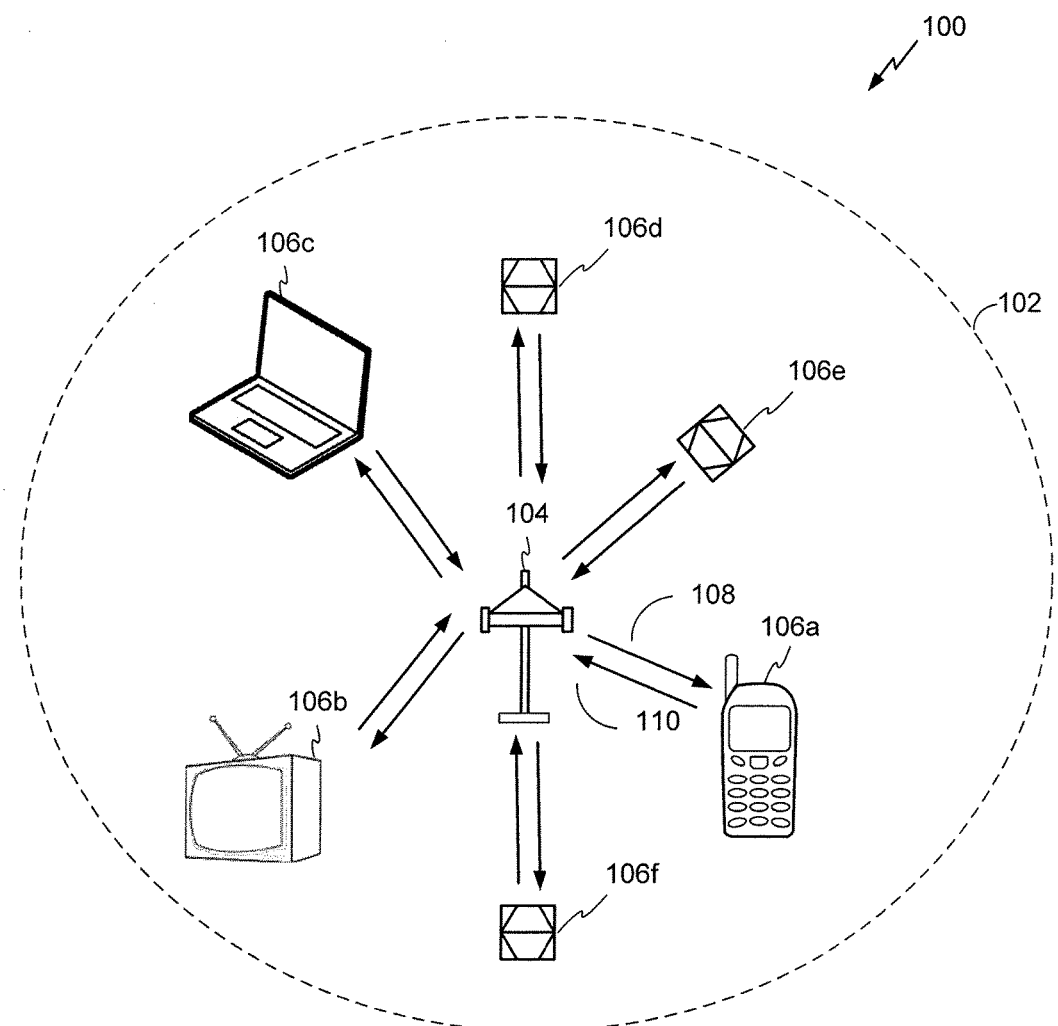
FIG. 1A illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11 ah protocol, which uses sub-1 GHz bands.

In a wireless network, channel access parameters can be defined to control access to a transmission medium (e.g., a wireless network) by devices communicating via the wireless network. A transmission medium can also be termed as a transmission channel. Examples of channel access parameters can include (but are not limited to) minimum contention window (CWmin), maximum contention window (CWmax), transmit opportunity (TXOP), transmission opportunity limit (TXOP limit), and inter frame space (AIFS). Further examples of channel access parameters can include (but are not limited to) parameters described as part of the enhanced distributed channel access (EDCA) parameters in the 802.11e industry standard. Similarly, transmission parameters can also be defined to dictate how data is sent on a transmission medium or transmission channel once access is granted. Examples of transmission parameters can include (but are not limited to) clear channel assessment (CCA) threshold levels, transmission rates (as defined as a PHY rate or a MAC rate (PHY rate minus overheads)), number of bytes, number of packets, size of each packet, type of each packet, transmission power and retransmission limits. In certain embodiments, both channel access parameters and transmission parameters can be collectively referred to as communication parameters. In particular embodiments, channel access parameters and/or transmission parameters (including both adapted channel access or transmission parameters and identified channel access parameters or previously used transmission parameters) are tunable and can be arbitrarily set.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless channel.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as STAs and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a channel may use feedback from its receiver to detect a carrier wave before trying to send its own transmission. "Multiple Access" describes the fact that multiple nodes may send and receive on a shared channel. Accordingly, in a CSMA type network, a transmitting node senses the channel and if the channel is busy (i.e. another node is transmitting on the channel), the transmitting node will defer its transmission to a later time. If, however, the channel is sensed as free, then the transmitting node may transmit its data on the channel.

Clear Channel Assessment (CCA) is used to determine the state of the channel before a node attempts to transmit thereon. The CCA procedure is executed while a node's receiver is turned on and the node is not currently transmitting a data unit such as a packet. A node may sense whether the channel is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the channel is a function of the received power of the transmission, where the received power is the transmitted power minus the path loss.

In particular embodiments, an AP may communicate a rule for adapting one or more channel access or transmission parameters based on an identified channel access parameter or previously used transmission parameter to wirelessly connected STAs. Thereafter, the STAs can transmit data with one or more adapted channel access or transmission parameters adapted based on the STA's values for an identified channel access parameter or previously used transmission parameter. In notable embodiments, an identified channel access parameter can be a channel access parameter used for current, future or past channel access while an identified previously used transmission parameter can be a transmission parameter used for a previous transmission.

In select embodiments, an identified previously used transmission parameter can include a transmission parameter used in a single packet or an average maximum or minimum over a number of packets transmitted previously. In an exemplary embodiment, an identified previously used transmission parameter can include a PHY or a MAC rate whose variation can relate to a corresponding variation to adapt one or more channel access or transmission parameters, such as but not limited to different adaptations for a lower or higher PHY or MAC rates based upon a single previously transmitted packet or a number of previously transmitted packets (such as but not limited to an average, maximum value or minimum value across the number of previously transmitted packets). In a further exemplary embodiment, an identified previously used transmission parameter can include a TXOP based upon a single previously transmitted packet or a number of previously transmitted packets (such as but not limited to an average, maximum value or minimum value across the number of previously transmitted packets). In a yet further exemplary embodiment, an identified previously used transmission parameter can include a size of a transmitted packet (such as but not limited to a physical layer service data unit (PSDU), MAC protocol data unit (MPDU), or MAC service data unit (MSDU)) based upon a single previously transmitted packet or a number of previously transmitted packets (such as but not limited to an average, maximum value or minimum value across the number of previously transmitted packets).

In certain embodiments, priority can be used as a proxy to describe how channel access or transmission parameters are adapted based on an identified channel access parameter or previously used transmission parameter. Different priority (as represented by different priority values or different priority levels) can be associated with different adaptations for channel access or transmission parameters based upon an identified channel access parameter or previously used transmission parameter. Thereby, a change in an identified channel access parameter or previously used transmission parameter can case a corresponding change in a priority value, which can cause a corresponding change in the adapted channel access or transmission parameters in accordance with a rule. Thereby, the relationships between an identified channel access parameter or previously used transmission parameter and an adapted channel access or transmission parameter may be mapped indirectly (as opposed to directly) by using a priority value. In certain embodiments, an increase in a priority value (caused by a change (such as but not limited to an increase) in an identified channel access parameter or previously used transmission parameter) can map to an adaptation of adapted channel access or transmission parameters that results in a higher probability of accessing a channel (such as but not limited to a lower CWmin or CWmax, higher CCA threshold levels, higher retransmission limits, shorter AIFS). In particular embodiments, a decrease in a priority value (caused by a change (such as but not limited to a decrease) in an identified channel access parameter or previously used transmission parameter) can map to an adaptation of adapted channel access or transmission parameters that results in lower probability of accessing a channel (such as but not limited to a higher CWmin or CWmax, lower CCA threshold levels, lower retransmission limits, longer AIFS). A priority value can be related to a particular adaptation of channel access or transmission parameters used in transmitting data. In further embodiments, channel access or transmission parameters can be directly adapted based upon an identified channel access parameter or previously used transmission parameter without a determination of a priority value.

In certain embodiments, channel access or transmission parameters can be dynamically adapted based upon an identified channel access parameter or previously used transmission parameter to achieve particular quality of service (QoS) targets. Examples of these QoS targets can include (but are not limited to) to set an equal time for transmission of data from all STAs (such as but not limited to by having each STA transmit with the same priority value or same time per access), to set an equal grade of service for all STAs, to maximize aggregated throughput by maximizing the sum of throughput through a basic service set (BSS), to achieve a fair throughput (such as but not limited to by lengthening TXOP, shortening CW, shortening AIFSN or assigning a higher priority value based upon a longer current queue length or a longer past queue length as measured by an average of previously used queue lengths over a time interval) or to minimize the latency of packets (such as but not limited to by assigning a higher priority value for current, future or previously used packets that are older/closer to their 'time to live'/expiration window).

In certain embodiments, an example of a QoS target to maximize efficiency by minimizing overhead and contention for channel access can include (but is not limited to): computing the priority value as a convex function of either the TXOP limit or the planned actual TXOP duration for the packet that will be transmitted (such as but not limited to an effort to give a shorter CWmin for shorter TXOP duration/limits in equations (1)-(4):

$$\text{priority value} = C1 * \log 2(\text{TXOP limit}) + C2 \quad (1)$$

$$\text{priority value} = C1 * \text{sqrt}(\text{TXOP limit}) + C2 \quad (2)$$

$$\text{priority value} = C1 * \log 2(\text{planned TXOP duration}) + C2 \quad (3)$$

$$\text{priority value} = C1 * \text{sqrt}(\text{planned TXOP duration}) + C2 \quad (4)$$

where C1 and C2 are constant numbers), to favor long TXOPs (such as but not limited to by assigning higher priority value for long TXOPs on current, future or past use), to set a lower priority for packets that are retransmitted or for higher average number of retransmissions in the past (such as but not limited to by setting priority value as a decreasing function of the number of retransmissions experienced by the previous head of queue packet(s)), to set a higher priority value for packets that are of a larger size in bytes (such as but not limited to where packet size can refer to a head of queue packet, last transmitted packet or a certain set of previously transmitted packets), to set a higher priority value for A-MPDUs or A-MSDUs that aggregate larger number of packets (such as but not limited to where the packets are smaller in size, or to set smaller maximum retry limit for packets with low transmission rates (PHY/MAC rates) for packets in current, future or past use). Each QoS target can correspond to an adaptation of one or more channel access or transmission parameters based on an identified channel access parameter or previously used transmission parameter. These identified channel access parameters or previously used transmission parameters can include channel access parameters set by an STA, an industry standard or historical or past values used as identified (including previously adapted) channel access parameters or transmission parameters.

In particular embodiments, channel access or transmission parameters can be dynamically adapted based upon an identified channel access parameter or previously used transmission parameter to achieve particular quality of service (QoS) targets by permitting certain preferred traffic (based upon an identified channel access parameter or previously used transmission parameter associated with the preferred traffic) a greater chance of being sent than other, non-preferred traffic. For example, a station transmitting preferred traffic may wait for less time on average before sending a packet than another station transmitting non-preferred traffic. Dynamically adapted channel access or transmission parameters can enable different treatment for preferred versus non-preferred traffic by defining different contention windows (CW), different arbitration inter-frame space (AIFS) values, CCA threshold levels, transmit power or retransmission limits as the adapted channel access or transmission parameters for preferred traffic, where the preferred traffic can be identified by associated identified channel access parameters or previously used transmission parameters.

In certain embodiments, an order at which data is assigned to be transmitted with the channel access parameters set by a particular priority value can be represented by a queue. In a queue, data assigned to be transmitted earlier is ahead in the queue relative to data assigned to be transmitted at a later time. In particular embodiments, different packets within a queue can be associated with different priority values and/or be adapted with different channel access or transmission parameters for transmission relative to other packets in the queue. When data is about to be sent, it can be termed as being at the head of the queue. In certain embodiments, a rule can dictate how channel access or transmission parameters can be dynamically adapted based upon an identified channel access parameter or previously used transmission parameter to achieve particular quality of service (QoS) targets during any interval of data transmission, including (but not limited to) per packet at the head of a queue, per interval of time or until the rule that is applied to an STA is updated by an AP.

In certain embodiments, an arbitration inter-frame space number (AIFSN) value may be adjusted according to an associated priority value. AIFSN values define shortening or expanding of a time period that a station is to wait between transmitting successive packets. A shorter wait time period permits a message to have a higher probability of being transmitted with low latency, which is a consideration for delay-critical data, such as media data (e.g., voice data, video data, or streaming data).

A period of contention free access to a channel is a transmit opportunity (TXOP) (e.g., transmission opportunity). The TXOP is a bounded time interval during which a station may send as many packets as possible, as long as the duration of a particular transmission does not extend beyond a maximum duration of the TXOP, also referred to as TXOP limit. Thereby, a TXOP is less than an associated TXOP limit. If the particular transmission extends beyond the TXOP limit, the transmission may be divided into multiple transmissions that do not extend beyond the maximum duration of the TXOP. The use of TXOPs reduces a problem of low rate stations acquiring an inordinate amount of channel time that can occur in legacy IEEE 802.11 distributed coordination function (DCF) media access control (MAC) networks. A TXOP limit time interval of zero (0) indicates the station is limited to a single MAC service data unit (MSDU) or MAC management protocol data unit (MMPDU).

In particular embodiments, a TXOP limit (e.g., transmit opportunity) may be defined for multiple priority values used in an IEEE 802.11ah compliant network. For example, a TXOP limit value for a particular priority value may be defined as approximately (e.g., ±20%) fifteen and six tenths (15.6) milliseconds (ms) which would allow a station to send one packet (e.g., two hundred fifty-six (256) Bytes at one hundred fifty (150) kilobytes per second (kbps)). TXOP limit values for another priority value may be defined based on a scaling factor of ten (10) applied to TXOP limit values used in a rule to define a priority value. As a further example, TXOP limit values for a lowest priority value may be defined as zero (0).

Thereby, dynamically adapted channel access or transmission parameters may be specified in accordance with different QoS targets that assign different priority values based upon channel access parameters. In a particular embodiment, the priority values may define channel access or transmission parameters such as corresponding contention window minimum (CWmin) values, corresponding contention window maximum (CWmax) values, and arbitration intra-frame spacing number (AIFSN) value for different priority values. In a particular embodiment, the CWmin value, the CWmax value, and the AIFSN value may be static values while in other embodiments, the CWmin value, the CWmax value, and the AIFSN value may be dynamic values as dependent upon an identified channel access parameter or previously used transmission parameter determined by the station in accordance with a rule.

FIG. 1A illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

During operation, an AP 104 can establish communication with the one or more STAs 106 using a connection routine (e.g., an IEEE 802.11ah compliant connection routine). Once connected to the AP 104, the STAs 106 may each transmit data to the AP 104 based at least in part on the access control data stored at each STA 106. The data can specify how to adapt one or more channel access or transmission parameters based on an identified channel access parameter or previously used transmission parameter.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1A, STAs 106 can include a cellular phone 106*a*, a television 106*b*, a laptop 106*c*, and a number of sensors 106*d-f* (e.g. a weather sensor or other sensor capable of communicating using a wireless protocol), to name a few.

Figure 1B:
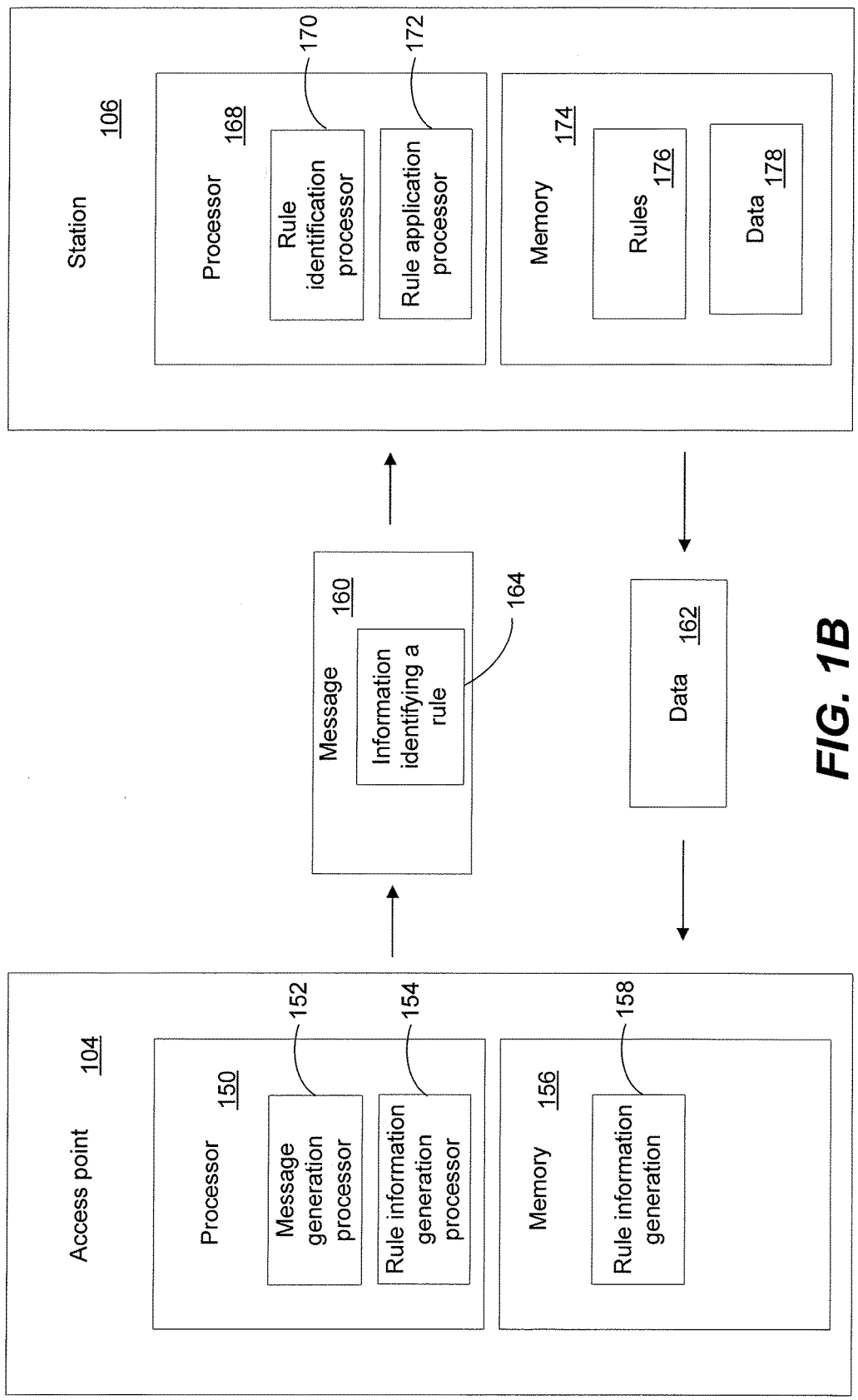
FIG. 1B is a block diagram illustrating various components of FIG. 1A in accordance with an embodiment.

FIG. 1B is a block diagram illustrating various components of FIG. 1A in accordance with an embodiment. The block diagram also includes an AP 104 and an STA 106 in communication over a network. The AP 104 includes a processor 150 and memory 156. The processor 150 can be a general purpose processor with components configured as a message generation processor 152 and a rule information generation processor 154. The message generation processor 152 can be configured to generate a message including information identifying a rule for adapting a channel access or transmission parameter based on an identified channel access parameter or previously used transmission parameter. The rule may be one of a plurality of rules, each of the rules defining a process for adapting a value of a communication parameter (e.g. a channel access parameter or transmission parameter) based on an identified channel access parameter. Also, each of the plurality of rules may provide a particular quality of service and a particular priority for communication between the STA 106 and AP 104. The rule information generation processor 154 can be configured to generate the information identifying a rule included in the message. Each of the message generation processor 152 and the rule information generation processor 154 can access rule information generation data 158 stored in the memory 156 of the access point 104. The rule information generation data 158 can be used by the rule information generation processor 154 to assist in the generation of the information identifying a rule. For example, the rule information generation data 158 can be in the form of a look up table from where a rule corresponding to a quality of service target can be identified using the rule information generation processor 154. The information identifying the rule can then be included in a message generated by the message generation processor 152. The generated message 160 with information identifying a rule 164 can be sent to from an AP 104 to a STA 106.

In certain embodiments, a STA 106 can also include a processor 168 and memory 174. The processor 168 can be a general purpose processor with components configured as a rule identification processor 170 and a rule application processor 172. The rule identification processor 170 can be configured to use a message from the AP 104 to identify a rule for adapting a channel access or transmission parameter based on an identified channel access parameter or previously used transmission parameter. The rule application processor 172 can be configured to apply the rule by adapting a channel access or transmission parameter based upon an identified channel access parameter or previously used transmission parameter. The memory 174 of the STA 106 can include a set of rules and data for transmission to the AP 104. The rule identification processor 170 can identify a rule for adapting a channel access or transmission parameter identified in the message from the rules stored in the memory 174. The rule application processor 172 can apply the identified rule by adapting a channel access or transmission parameter based on an identified channel access parameter or previously used transmission parameter in accordance with the identified rule. The data 178 stored in memory can then be sent as data 162 with the adapted channel access or transmission parameters.

Figure 2A:
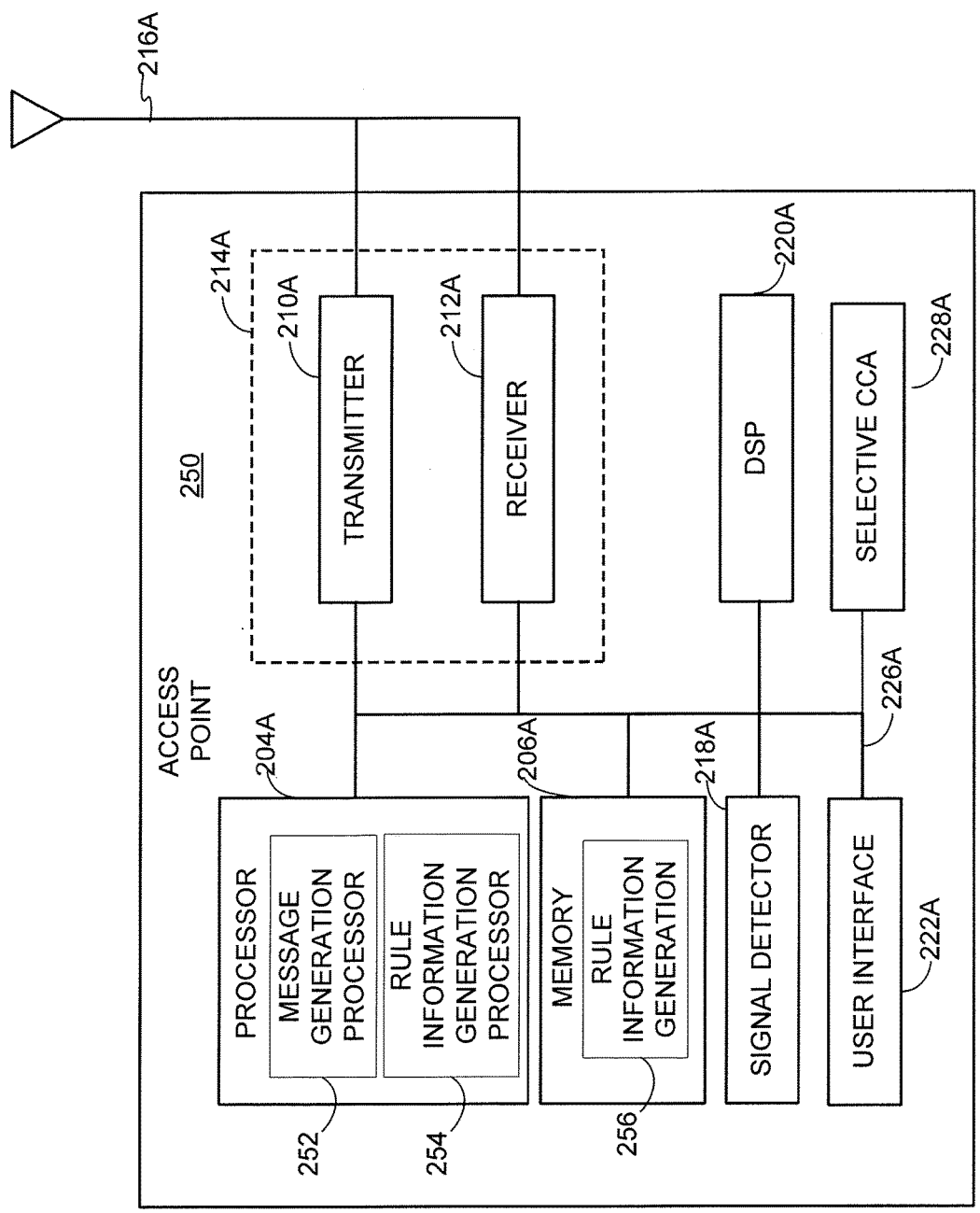
FIG. 2A illustrates various additional components that may be utilized in the AP illustrated in FIG. 1B in accordance with an embodiment.
Figure 2B:
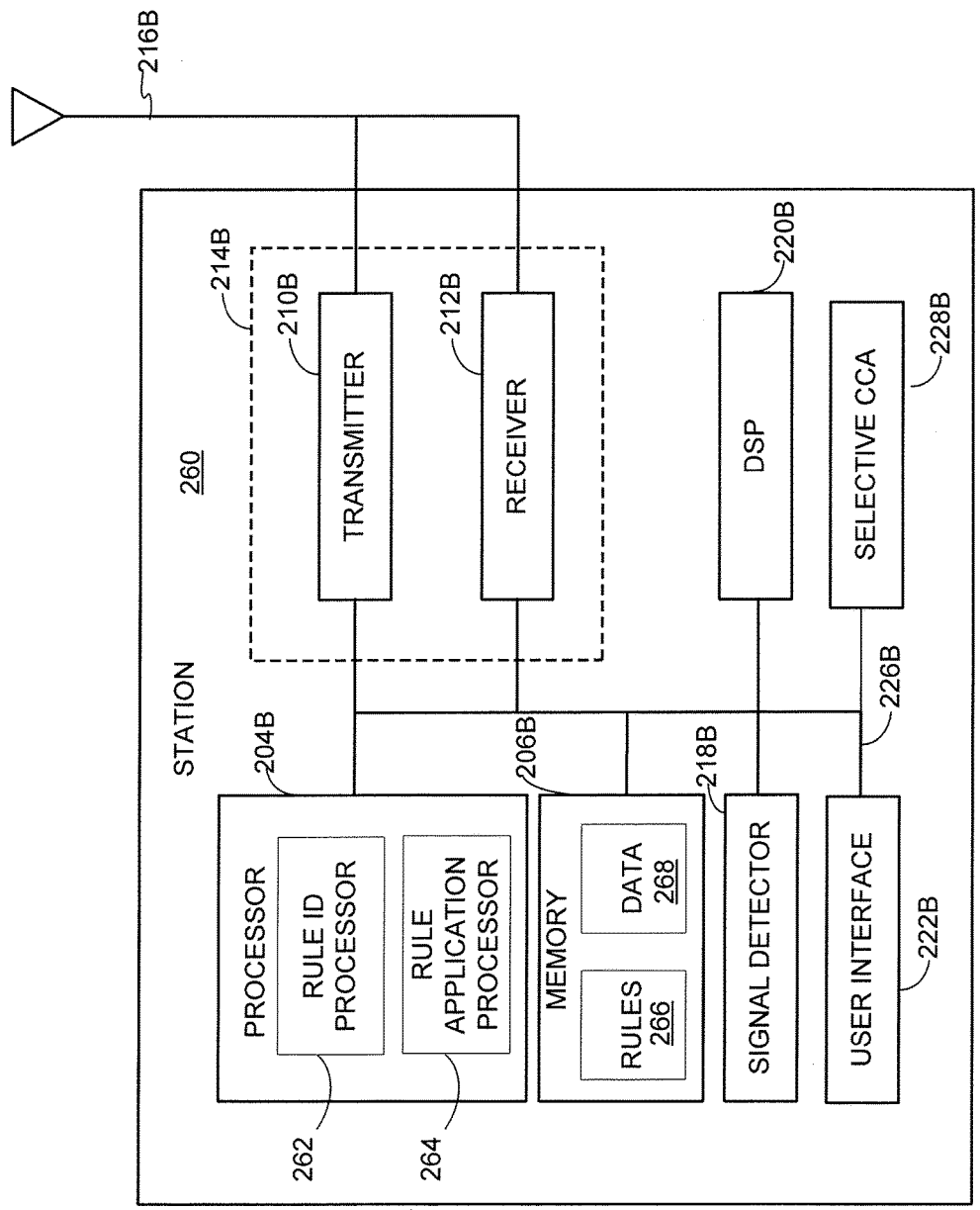
FIG. 2B illustrates various additional components that may be utilized in the STA illustrated in FIG. 1B in accordance with an embodiment.

FIG. 2A illustrates various additional components that may be utilized in the AP illustrated in FIG. 1B in accordance with an embodiment. Similarly, FIG. 2B illustrates various additional components that may be utilized in the STA illustrated in FIG. 1B in accordance with an embodiment. The AP 250 or STA 260 may include a processor 204A, 204B which controls operation of its respective AP 250 or STA 260. The processor 204A, 204B may also be referred to as a central processing unit (CPU). As discussed above in FIG. 1B, the processor 204A in an access point 250 can be a general purpose processor with components configured as a message generation processor 252 and a rule information generation processor 254. Similarly, as discussed above in FIG. 1B, the processor 204B in an STA 260 can be a general purpose processor with components configured as a rule identification processor 262 and a rule application processor 264. The processor 204A, 204B may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Memory 206A, 206B, which may include both read-only memory (ROM) and random access memory (RAM), provides instructions and data to the processor 204A, 204B. A portion of the memory 206A, 206B may also include non-volatile random access memory (NVRAM). The processor 204A, 204B typically performs logical and arithmetic operations based on program instructions stored within the memory 206A, 206B. The instructions in the memory 206A, 206B may be executable to implement the methods described herein. As discussed above in FIG. 1B, the memory 206A, 206B can include rule information generation data 256 when implemented in an AP 250 or rules 266 and data 268 when implemented in an STA 260.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The AP 250 or STA 260 may also include a transmitter 210A, 210B and a receiver 212A, 212B to allow transmission and reception of data between the AP 250 or STA 260 and a remote location. Further, the transmitters 210A, 210B and the receiver 212A, 212B may be configured to allow transmission and reception of setup and/or configuration packets or frames between an AP 250 or STA 260 and a remote location. The transmitter 210A, 210B and receiver 212A, 212B may be combined into a transceiver 214A, 214B. An antenna 216A, 216B may be attached to the housing 208A, 208B and electrically coupled to the transceiver 214A, 214B. Alternatively, or additionally, the AP 250 or STA 260 may include an antenna 216A, 216B formed as part of the housing 208A, 208B or may be an internal antenna. The AP 250 or STA 260 may also include (not shown) multiple transmitters, multiple receivers, multiple transceivers, and/or multiple antennas.

The AP 250 or STA 260 may also include a signal detector 218A, 218B that may be used in an effort to detect and quantify the level of signals received by the transceiver 214A, 214B. The signal detector 218A, 218B may detect such signals as total energy, energy per subcarrier per symbol, power spectral density and other signals. The AP 250 or STA 260 may also include a digital signal processor (DSP) 220A, 220B for use in processing signals. The DSP 220A, 220B may be configured to generate a data unit for transmission. In some aspects, the data unit may comprise a physical layer data unit (PPDU). In some aspects, the PPDU is referred to as a packet or a frame.

The AP 250 or STA 260 may further comprise a user interface 222A, 222B in some aspects. The user interface 222A, 222B may comprise a keypad, a microphone, a speaker, and/or a display. The user interface 222A, 222B may include any element or component that conveys information to a user of the AP 250 or STA 260 and/or receives input from the user.

The AP 250 or STA 260 may further comprise a selective clear channel assessment (CCA) module 228A, 228B. The selective CCA module 228A, 228B may include any element or component that performs a clear channel assessment for the AP 250 or STA 260 based on one or more parameters. The parameters may include a transmission power, transmission bandwidth, and/or an energy detection threshold.

The various components of the AP 250 or STA 260 may be housed within a housing 208A, 208B. Further, the various components of the AP 250 or STA 260 may be coupled together by a bus system 226A, 226B. The bus system 226A, 226B may include a data bus, for example, as well as a power bus, a control signal bus, and a status signal bus in addition to the data bus. Those of skill in the art will appreciate the components of the AP 250 or STA 260 may be coupled together, or may accept or provide inputs to each other using some other mechanism.

Although a number of separate components are illustrated in FIGS. 2A and 2B, those of skill in the art will recognize that one or more of the components may be combined or commonly implemented. For example, the processor 204A, 204B may be used to implement not only the functionality described above with respect to the processor 204A, 204B, but also to implement the functionality described above with respect to the signal detector 218A, 218B and/or the DSP 220A, 220B. Further, each of the components illustrated in FIGS. 2A and 2B may be implemented using a plurality of separate elements.

In certain embodiments, an AP 104 can identify a rule for adapting one or more channel access or transmission parameters based on an identified channel access parameter or previously used transmission parameter. The rule can be in the form of a formula, a tabular relationship or a tabular relationship of formulas delineating how to adapting one or more channel access or transmission parameters based on an identified channel access parameter or previously used transmission parameter. The rule can be sent from the AP 104 to the STAs 106. The rule can be reflective of a QoS target.

As discussed with regards to FIGS. 2A and 2B, an AP 250 may include one or more processors and one or more memories. For example, the AP 250 may include a memory storing identifiers of a rule for adapting one or more channel access or transmission parameters based on an identified channel access parameter or previously used transmission parameter. The memory can also store instructions executable by the processor(s) to perform various functions for transmitting a message identifying a rule for adapting one or more channel access or transmission parameters based on an identified channel access parameter or previously used transmission parameter to an STA 260.

Figure 3:
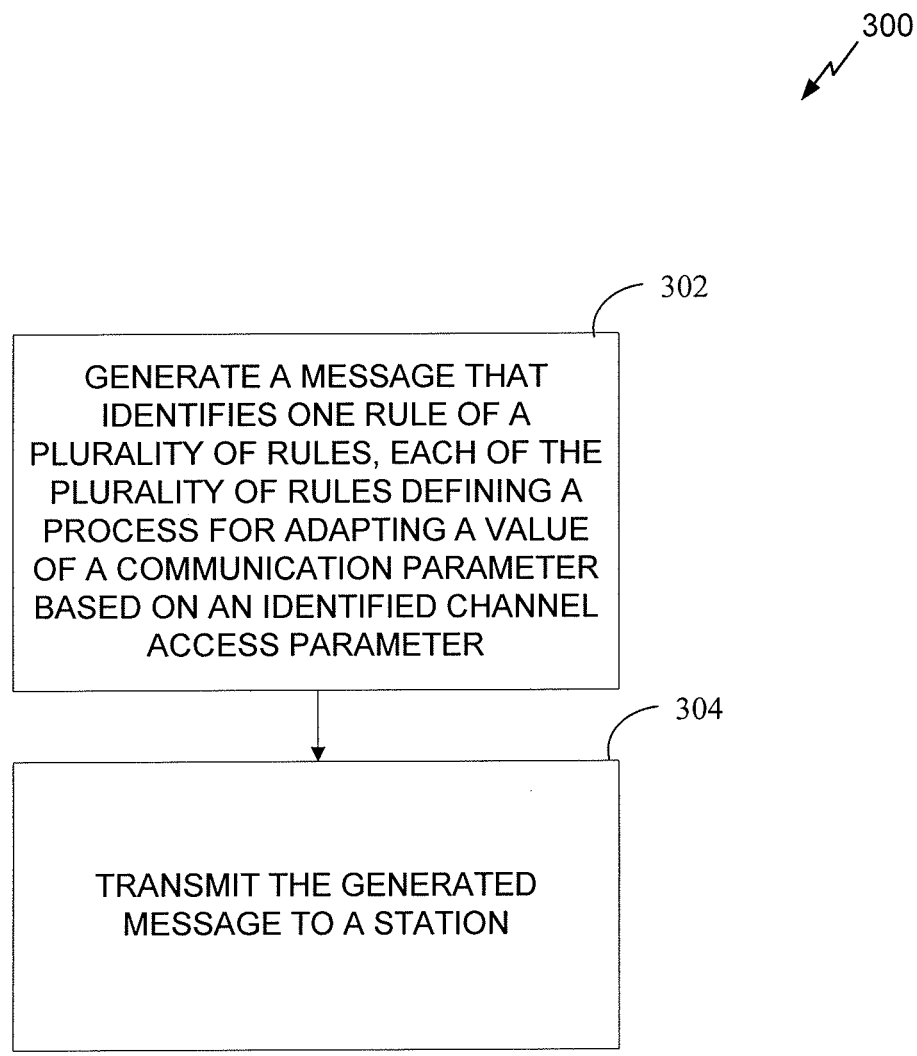
FIG. 3 is a flowchart illustrating a process for transmitting a message with a rule for adapting one or more channel access or transmission parameters in accordance with an embodiment.

A flowchart illustrating a process for transmitting a message with a rule in accordance with an embodiment is illustrated in FIG. 3. The process 300 can be performed by an AP 104 illustrated in FIG. 1A. At state 302, a message is generated by the AP 104 that identifies one rule of a plurality of rules, each of the plurality of rules defining a process for adapting a value of a communication parameter (i.e. a channel access or transmission parameter) based on an identified channel access parameter. Also, each of the plurality of rules may provide a particular quality of service and a particular priority for communication with the AP 104. In certain embodiments, the message generated by the AP 104 may include information identifying a rule for adapting one or more channel access or transmission parameters based on an identified channel access parameter or previously used transmission parameter. Next, at state 304, the generated message is transmitted 304 from the AP 104 to an STA 106.

In certain embodiments, the AP 104 includes means for generating a message including information identifying a rule for adapting one or more channel access or transmission parameters based on an identified channel access parameter or previously used transmission parameter. In certain embodiments, the means for generating a message including information identifying a rule may comprise a processor, such as the processor 150 of FIG. 1B. The AP 104 further includes means for transmitting the generated message to a station. In certain embodiments, the means for transmitting the generated message to a station may comprise transmitter, such as the transmitter 210A of FIG. 2A.

An STA 106 can access data structures that enable the STA 106 to use a rule identified by an AP 104 to adapt one or more channel access or transmission parameters based on an identified channel access parameter or previously used transmission parameter. The identified channel access parameter or previously used transmission parameter is applied at the STA, such as but not limited to by taking values associated with the identified channel access parameter or previously used transmission parameter of the STA for adapting one or more channel access or transmission parameters. The data structures accessible to the STAs 106 can include the identified rule in the form of a formula, a tabular relationship or a tabular relationship of formulas delineating how to adapting one or more channel access or transmission parameters based on an identified channel access parameter or previously used transmission parameter. The data structures can be accessible to the STA 106 in the memory associated with the STA 106 or by being retrieved by the STA 106 from another device (such as but not limited to another STA 106 or the AP 104) from over a network.

Figure 4:
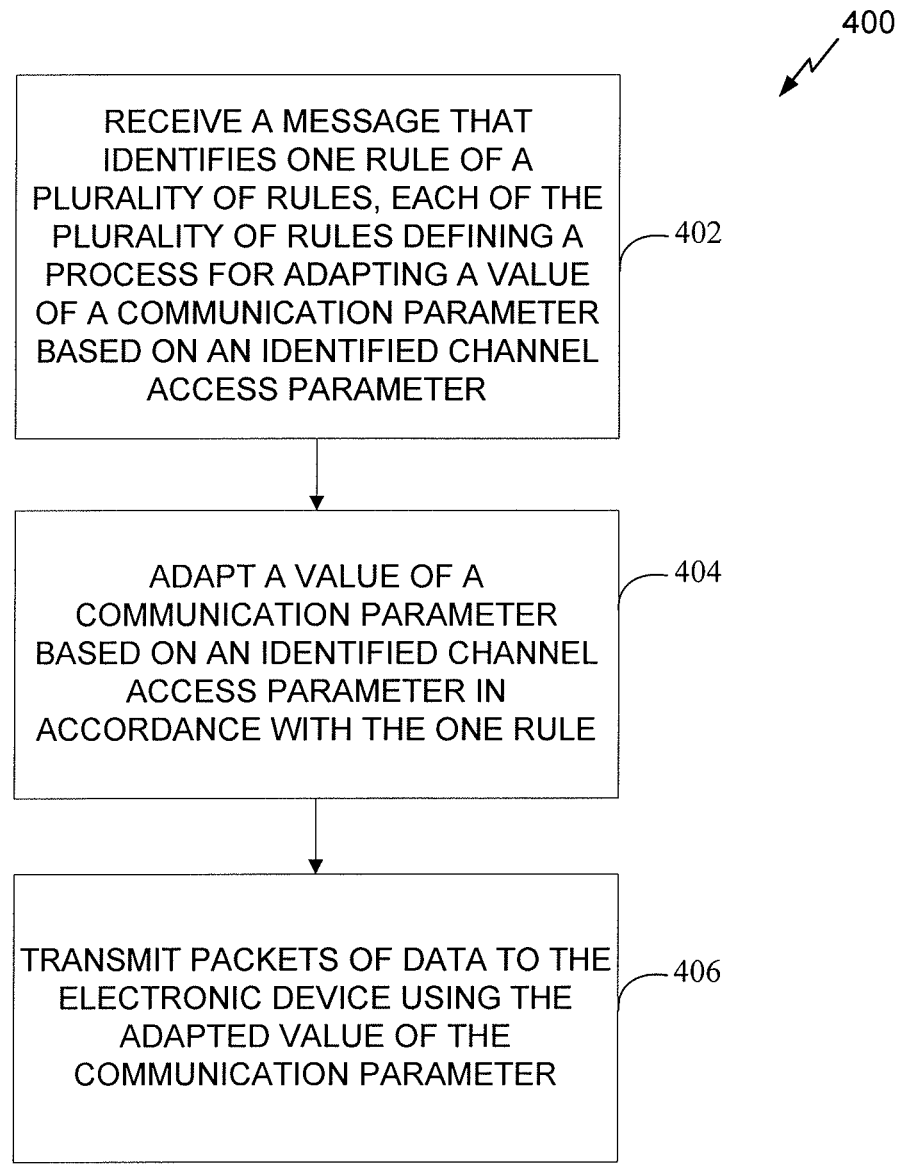
FIG. 4 is a flowchart illustrating a process for transmitting data using the one or more adapted channel access or transmission parameters in accordance with an embodiment.

A flowchart illustrating a process for transmitting data using the one or more adapted channel access or transmission parameters in accordance with an embodiment is illustrated in FIG. 4. The process 400 can be performed by an STA 106 of FIG. 1A. At state 402, a message that identifies one rule of a plurality of rules, each of the plurality of rules defining a process for adapting a value of a communication parameter (i.e. a channel access parameter or a transmission parameter) based on an identified channel access parameter is received. Also, each of the plurality of rules may provide a particular quality of service and a particular priority for communication from the STA 106 to the AP 104. In certain embodiments, the message may include information identifying a rule for adapting one or more channel access or transmission parameters based on an identified channel access parameter or previously used transmission parameter. Next, at state 404, the STA 106 may adapt a value of a communication parameter based on an identified channel access parameter in accordance with the identified one of the plurality of rules. In certain embodiments, the STA 106 may adapt the value of a communication parameter by adapting one or more channel access or transmission parameters based on an identified channel access parameter or previously used transmission parameter. Next, at state 406, the STA 106 transmits packets of data using the adapted value of the communication parameter.

In certain embodiments the STA 106 includes means for receiving a message including information identifying a rule for adapting one or more channel access or transmission parameters based on an identified channel access parameter or previously used transmission parameter. In certain embodiments, the means for receiving may comprise a receiver, such as the receiver 212B of FIG. 2B. The STA 106 further includes means for applying the rule to adapt one or more channel access or transmission parameters based on an identified channel access parameter or previously used transmission parameter. In certain embodiments, the means for applying the rule may comprise a processor, such as the processor 168 of FIG. 1B. The STA 106 further includes means for transmitting data using the one or more adapted channel access or transmission parameters. In certain embodiments, the means for transmitting data may comprise a transmitter, such as the transmitter 210B of FIG. 2B.

In certain embodiments, a data structure accessible to an STA 106 can define one or more rules for relating a priority value with an identified channel access parameter or previously used transmission parameter as dictated by a QoS target specified by an AP 104 or an industry standard. The priority value can then be utilized to adapt one or more channel access or transmission parameters used in transmitting data from an STA 106 to an AP 104. In one embodiment, an identified channel access parameter or previously used transmission parameter is determined by an STA 106 as different STAs may use different channel access parameters dependent upon the STA 106 type (e.g. sensor, non-sensor, battery operated, mains operated, etc.), membership in a particular group, type of traffic, or other criteria. In a particular embodiment, a value for different identified channel access parameters or previously used transmission parameters associated with each STA 106 type or group (or based on other criteria) may be defined in an industry standard (e.g., IEEE 802.11ah) and may be known by all STAs that are compliant with the industry standard. These channel access parameters can then be adapted based upon the rule provided by the AP 104.

A data structure 500 used to associate channel access parameters with a priority value in accordance with an embodiment is illustrated in FIG. 5A. The data structure 500 is in the form of a table and can be stored in a relational database accessible to the STA 106 of FIG. 1A in the memory of the STA. The data structure 500 includes various columns indicating an index 502, QoS target 504 and rules 506 associated with the index or QoS target. In certain embodiments, information identifying a rule may be a value of the index, 502, the QoS target 504 or any other type of information that may be used to identify one of the rules 506. Each of the rules specify a relationship between a priority value and at least one identified channel access parameter or previously used transmission parameter as part of a process for adapting a value of a communication parameter (i.e. a channel access parameter or transmission parameter). Also, each of the rules provides a particular quality of service and a particular priority for communication from the STA 106. The data structure 500 need not include both an index or a QoS target as in certain embodiments the data structure 500 can only relate a QoS with a rule, an index with a rule or any other identifier (or any information that may be used as an identifier) with a rule. The data structure 500 can include an arbitrary number of rules as indicated with the index value and QoS target values of "n". In the illustrated embodiment, the rules can be used by a processor to set a priority value based upon an identified channel access parameter or previously used transmission parameter, such as but not limited to where a priority value is set by equation (1) or equation (2) discussed above, priority value=TXOP limit or where priority value=CWmax−CWmin. Although particular relationships between an identified channel access parameter or previously used transmission parameter and priority values are discussed herein, any relationship between an identified channel access parameter or previously used transmission parameter and priority value can be utilized in accordance with different embodiments.

In particular embodiments, a data structure 500 accessible to an STA 106 can define one or more rules for adapting one or more channel access or transmission parameters in accordance with a priority value as specified by an AP 104 or an industry standard. The priority values can be related to an adaption of one or more channel access or transmission parameters such that a greater priority value can enable data from the station a greater chance of being sent to an AP 104 relative to a lesser priority value.

A data structure 550 used to associate a priority value with an adaption setting in accordance with an embodiment is illustrated in FIG. 5B. The data structure 550 is in the form of a table and can be stored in a relational database accessible to the STA 106 of FIG. 1A in the memory of the STA. The data structure 550 includes a column indicating a priority value 552 and adaptation settings 554 for adapting channel access or transmission parameters based upon the priority value established from an identified channel access parameter or previously used transmission parameter. The data structure 550 can include arbitrary number priority values/adaptation settings as indicated with the priority values of "n". In certain embodiments, the priority values can be of a continuous spectrum of values from a low priority value (such as but not limited to "0") to an arbitrary value set at an arbitrary value "n." Thereby, adaptation settings can relate channel access or transmission parameters to a continuous spectrum of values. In particular embodiments, a priority value can be scaled to a limited number of discrete priority value levels (such as but not limited to an integer). Thereby, related adaptation setting for adapting channel access or transmission parameters are also set to a limited number of settings for adapting channel access or transmission parameters. Although particular relationships between adaptation settings for channel access or transmission parameters and priority values are discussed herein, any relationship between an adaptation setting and a priority value can be utilized in accordance with different embodiments.

Figure 6:
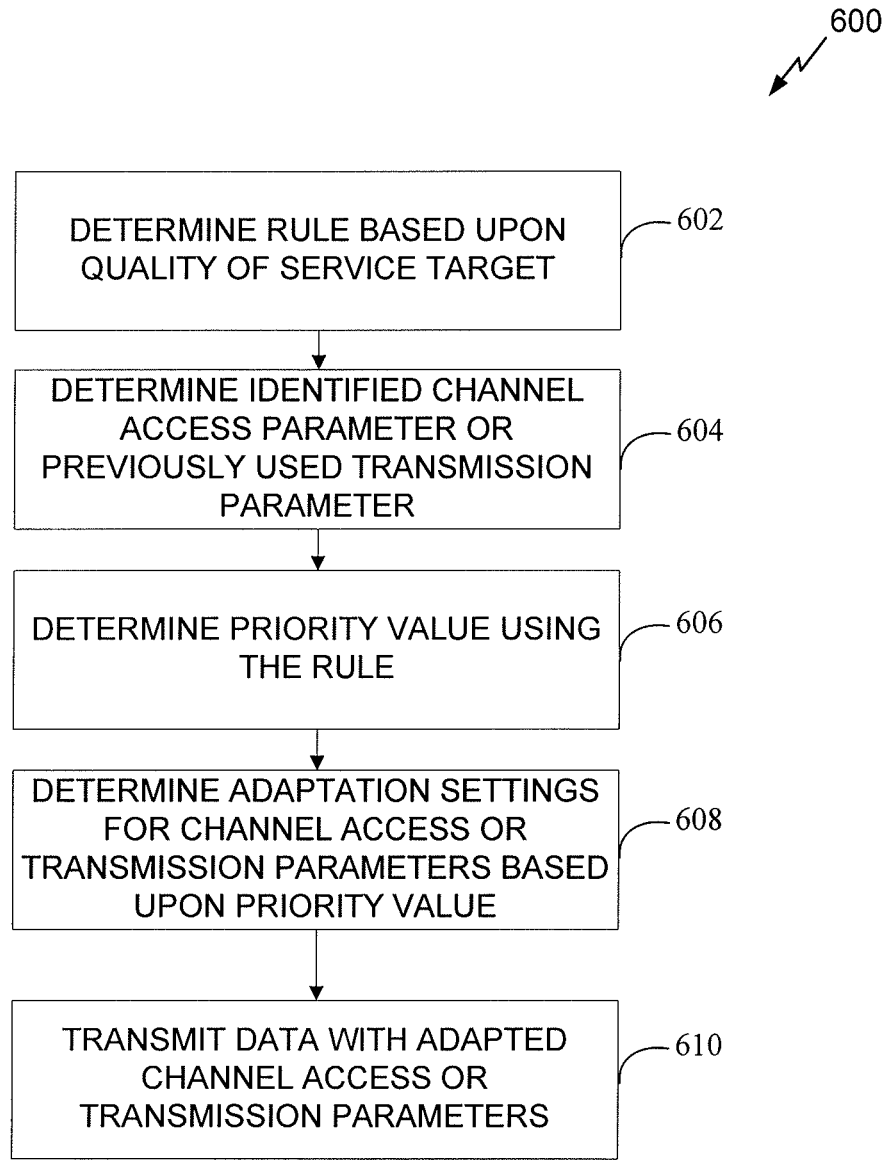
FIG. 6 is a flowchart illustrating a process for transmitting data with adapted channel access or transmission parameters based upon a quality of service target in accordance with an embodiment.

A flowchart illustrating a process for transmitting data with adapted channel access or transmission parameters based upon a quality of service target in accordance with an embodiment is illustrated in FIG. 6. The process 600 can be performed by a STA 106 of FIG. 1A. At state 602, a rule based upon a QoS target is determined. The QoS target can be identified from a message received from an AP 104. Next, at state 604, an identified channel access parameter or previously used transmission parameter is determined 604 by the STA. An identified channel access parameter or previously used transmission parameter can be determined based upon any criteria such as but not limited to an industry standard and/or the STA 106 (such as but not limited to the type of STA 106 or the intended operation of the STA). Next, at state 606, a priority value is determined utilizing the rule. The rule can set a relationship between a priority value and at least one identified channel access parameter or previously used transmission parameter. Next, at state 608, adaptation settings are determined based upon the determined priority value. Next, at state 610, data is transmitted using channel access or transmission parameters set based upon the adaptation settings.

In certain embodiments, a message identifying a rule can be sent in any form of communication from the AP 104 to an STA 106 such as but not limited to in a Beacon frame, in an association response, in a probe response, during operation through a management frame or by means of an Information Element.

In a particular embodiment, the message may consist of a field encoding an index or other identifier that identifies a rule or a QoS target with associated rules. In a particular embodiment, a message can be for one or more groups of STAs or types of STAs. The identifier of the rule may be included as a new field in the beacon frame or included in an EDCA parameter set IE. In another embodiment, a new Information Element may be defined to store the rule for adapting one or more channel access or transmission parameters based on an identified channel access parameter or previously used transmission parameter for one or more of each of the STAs or type of STAs or group of STAs. One or more of these EDCA parameter set IEs may be included in the beacon or may be sent during association/re-association (e.g., in an association/re-association response message). Hence, different STAs or groups of STAs or type of STAs may have different rules for adapting one or more channel access or transmission parameters based on an identified channel access parameter or previously used transmission parameter.

In one embodiment, each STA, or group of STAs or type of STAs, may use a rule for adapting one or more channel access or transmission parameters based on an identified channel access parameter or previously used transmission parameter only within a given interval of time. In one embodiment, the interval of time during which the rule for adapting one or more channel access or transmission parameters based on an identified channel access parameter or previously used transmission parameter is set for each STA, or group of STAs or type of STAs, is to be used may be indicated in the beacon, during association, or may be pre-defined as a multiple of beacons or may be limited to an interval of time when uplink access is granted. In another embodiment, certain types of STAs may operate using the same rule for adapting one or more channel access or transmission parameters based on an identified channel access parameter or previously used transmission parameter.

In one embodiment, STAs 106 may request a rule for adapting one or more channel access or transmission parameters based on an identified channel access parameter or previously used transmission parameter to the AP 104. For example, a STAs 106 may be requesting allowance to operate within a certain QoS target. The AP 104 can grant, deny or modify the request. In certain embodiments, the STAs 106 may request to be allowed access with a specific QoS target as advertised by the AP 104. The AP 104 can either modify the group with the QoS target to include the requesting STA 106 or change the association of the STA 106 to be associated with the group with the specific QoS target.

In particular embodiments, an AP 104 may successively indicate to STAs 106, or to a group of STAs 106 or to one or more types of STAs 106, a rule for adapting one or more channel access or transmission parameters based on an identified channel access parameter or previously used transmission parameter in one or more enhanced distributed channel access (EDCA) parameter set Information Elements (IEs). The one or more EDCA parameter set IEs may be sent during association/re-association (e.g., as data in an association/re-association response message) or included in a beacon frame. In one embodiment the EDCA parameter set IE may be defined in an IEEE 802.11 standard. In another embodiment, the EDCA parameter set IE may be enhanced from that defined in an IEEE 802.11 standard by appending one or more rules for each group of STAs 106 or type of STAs 106.

Figure 7:
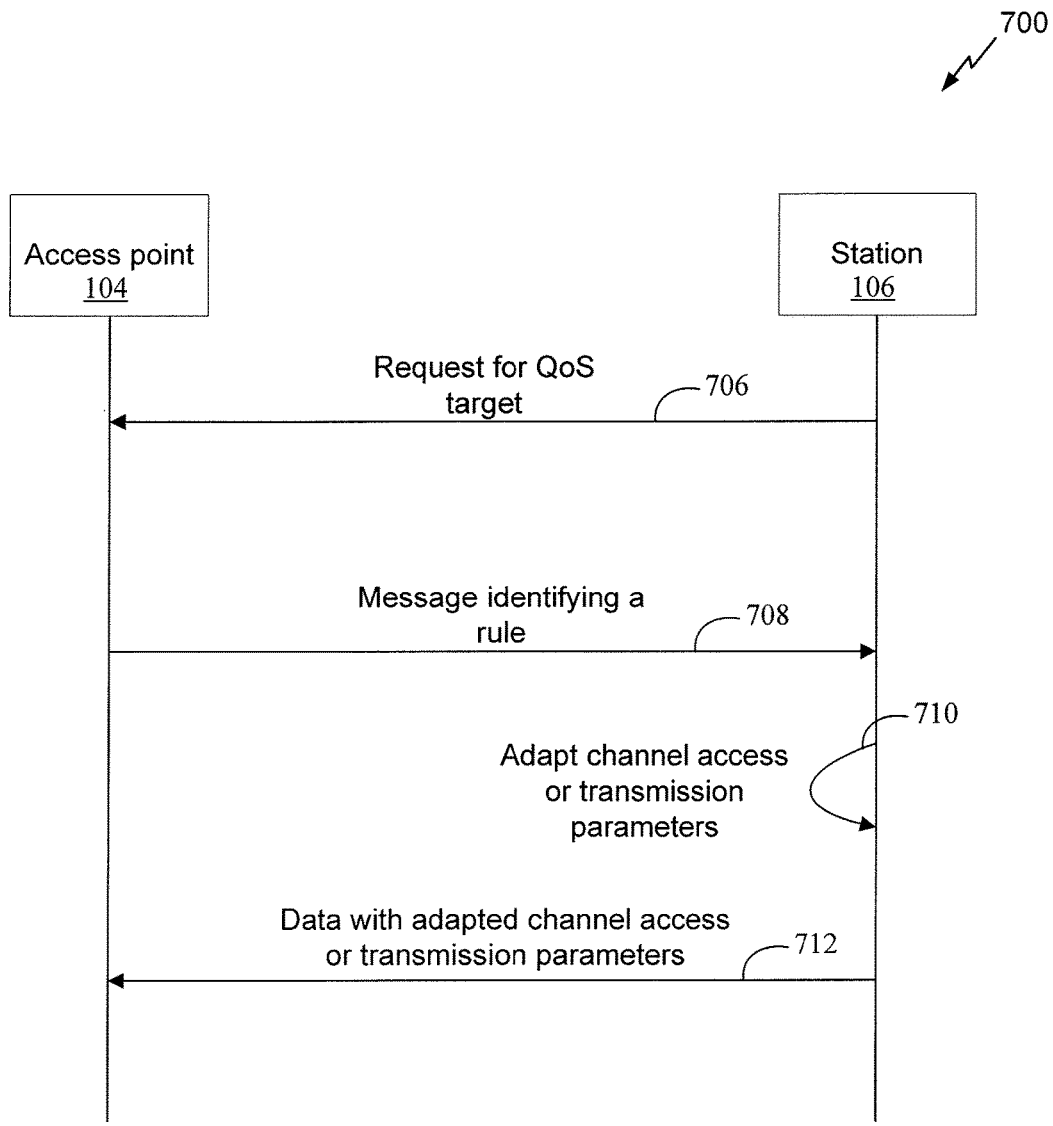
FIG. 7 is a timing diagram illustrating a process of communication between an access point and a station within the wireless communication system of FIG. 1A in accordance with an embodiment.

A timing diagram 700 illustrating a process of communication between an access point and a station of the system in FIG. 7 is illustrated in FIG. 1A in accordance with an embodiment. The process can be performed by an STA 106 or an AP 104 of FIG. 1A. The process includes a STA 106 requesting (706) a QoS target from an AP 104. The STA 106 can request a QoS target in any manner, including by default upon connecting with the AP 104 or when the STA 106 determines that a particular QoS target is warranted. The AP 104 can then send (708) a message identifying a rule that adapts one or more channel access or transmission parameters based on an identified channel access parameter or previously used transmission parameter to the STA 106. The rule can be associated with a QoS target to effectuate the QoS target. The rule can be in the form of an identification of the QoS target (such as but not limited to an index value that identifies the QoS target) that can be used by the STA 106 to identify a rule or by sending over the rule itself to the STA 106. The STA 106 can utilize the message identifying a rule to adapt (710) channel access or transmission parameters based upon the rule. In certain embodiments, the rule can set a relationship between channel access parameters and a priority value. The priority value can then be utilized for the adaptation of channel access or transmission parameters. The STA 106 can then send (712) the data to the AP 104 with the adapted channel access or transmission parameters.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal or a channel). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An electronic device for communication over a wireless network, comprising:
  an electronic hardware processor configured to:
    generate a message indicating that a station is to determine a quality of service priority value for the station's transmissions to the electronic device as a logarithmic function of a transmission opportunity (TXOP) limit or a transmission opportunity (TXOP) duration, wherein the quality of service priority value defines one or more of a contention window minimum (CWmin) value, a corresponding contention window maximum (CWmax) value, and an arbitration infra-frame spacing number (AIFSN) value for the station; and a transceiver configured to transmit the message to the station.

2. The electronic device of claim 1, wherein the station's determination of the quality of service priority value for the station's transmissions to the electronic device applies to each packet of data transmitted from the station.

3. The electronic device of claim 1, wherein the station's determination of the quality of service priority value for the station's transmissions to the electronic device applies to all packets of data transmitted from the station within a single transmit opportunity.

4. The electronic device of claim 1, wherein the message indicates the quality of service priority value is to be a same value for at least two stations in communication with the electronic device.

5. The electronic device of claim 1, wherein the message further indicates the station is to determine a transmission opportunity for the station as a function of a rate of transmission of data from the station to the electronic device.

6. The electronic device of claim 1, wherein the message indicates the station is to determine the quality of service priority value for transmitting data to the electronic device as a convex function of the transmission opportunity limit or the transmission opportunity duration.

7. The electronic device of claim 1, wherein the transceiver is configured to transmit the message to the station in a beacon frame.

8. The electronic device of claim 1, wherein the transceiver is configured to transmit the message to the station in an association response frame.

9. The electronic device of claim 1, wherein the message indicates the station is to determine the quality of service priority value as a function of a transmission parameter of the station, the transmission parameter selected from a group including a transmit power and a retransmission limit.

10. The electronic device of claim 1, further comprising:
generating a second message, the second message indicating the station compares a particular clear channel assessment threshold included in the second message to an energy level of the wireless network to determine whether the wireless network is busy; and
transmitting the second message to the station.

11. The electronic device of claim 1, further comprising:
generating a second message, the second message indicating the station determines a size of a packet transmission as a function of a size of a packet previously transmitted by the station; and
transmitting the second message to the station.

12. The electronic device of claim 1, further comprising:
generating a second message, the second message indicating the station determines a rate for station transmissions to the electronic device as a function of a rate previously transmitted by the station to the electronic device; and
transmitting the second message to the station.

13. The electronic device of claim 1, further comprising:
generating a second message, the second message indicating the station determines, at the station, the quality of service priority value for station transmissions to the electronic device as a function of a transmission queue length of the station; and
transmitting the second message to the station.

14. The electronic device of claim 1, further comprising:
generating a second message, the second message indicating the station determines, at the station, the quality of service priority value for station transmissions to the electronic device as a function of an average of previous queue lengths within a time period; and
transmitting the second message to the station.

15. The electronic device of claim 1, wherein the logarithmic function is of the transmission opportunity limit.

16. The electronic device of claim 1, wherein the logarithmic function is of the transmission opportunity duration.

17. A station for communication over a wireless network, comprising:
a transceiver configured to receive a message from an electronic device that indicates that the station is to determine a quality of service priority value for the station's transmissions to the electronic device as a logarithmic function of a transmission opportunity limit or a transmission opportunity duration, wherein the quality of service priority value defines one or more of a contention window minimum (CWmin) value, a corresponding contention window maximum (CWmax) value, and an arbitration infra-frame spacing number (AIFSN) value for the station; and
a processor configured to determine the quality of service priority value according to the message,
wherein the transceiver is configured to transmit packets of data to the electronic device using the determined quality of service priority value.

18. The station of claim 17, wherein the determined quality of service priority value applies to each packet of data transmitted from the station.

19. The station of claim 17, wherein the determined quality of service priority value applies to all packets of data transmitted from the station within a single transmit opportunity.

20. The station of claim 17, wherein the message further indicates the station is to determine a value of the transmission opportunity based upon a rate of transmission of data from the station to the electronic device.

21. The station of claim 17, wherein the message indicates the quality of service priority value is determined as a convex function of the transmission opportunity limit.

22. The station of claim 17, wherein the message comprises a beacon frame.

23. The station of claim 17, wherein the message comprises an association response frame.

24. The station of claim 17, wherein the message indicates the station is to determine the quality of service priority value based on at least one of a transmit power and a retransmission limit.

25. A method for communication over a wireless network, comprising:
generating a message that indicates a station is to determine a quality of service priority value for the station's transmissions to the electronic device as a logarithmic function of a transmission opportunity limit or a transmission opportunity duration, wherein the quality of service priority value defines one or more of a contention window minimum (CWmin) value, a corresponding contention window maximum (CWmax) value, and an arbitration infra-frame spacing number (AIFSN) value for the station; and
transmitting the message to the station.

26. The method of claim 25, wherein the station's determination of the quality of service priority value for the station's transmissions to the electronic device applies to each packet of data transmitted from the station.

27. The method of claim 25, wherein the station's determination of the quality of service priority value for the station's transmissions to the electronic device applies to all packets of data transmitted from the station within a single transmit opportunity.

28. The method of claim 25, wherein the message indicates the quality of service priority value is determined to be a same value for at least two stations.

29. The method of claim 25, wherein the message indicates the quality of service priority value for the station's transmission are also a function of a rate of transmission of data from the station.

30. A method for communication over a wireless network, comprising:

receiving, by a station, a message from an electronic device that indicates the station is to determine a quality of service priority value for the station's transmissions to the electronic device as a logarithmic function of a transmission opportunity limit or a transmission opportunity duration, wherein the quality of service priority value defines one or more of a contention window minimum (CWmin) value, a corresponding contention window maximum (CWmax) value, and an arbitration infra-frame spacing number (AIFSN) value for the station;

determining the quality of service priority value in accordance with the indication in the message; and transmitting packets of data to the electronic device using the determined quality of service priority value.

31. The method of claim 30, wherein the determined quality of service priority value is applied by the station to each packet of data transmitted to the electronic device.

32. The method of claim 30, wherein the determined quality of service priority value is applied by the station to all packets of data transmitted to the electronic device within a single transmit opportunity.

33. The method of claim 30, wherein the message further indicates the station is to determine a value for a transmission opportunity as a function of a rate of the transmission of the packets of data.

* * * * *